United States Patent
Li et al.

(10) Patent No.: US 9,677,910 B1
(45) Date of Patent: Jun. 13, 2017

(54) ADVANCED METERING INFRASTRUCTURE SYSTEM

(71) Applicant: INSTITUTE FOR INFORMATION INDUSTRY, Taipei (TW)

(72) Inventors: Ping-Heng Li, Taipei (TW); Wei-Ho Chung, Taipei (TW); Chan-Nan Lu, Kaohsiung (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 0 days.

(21) Appl. No.: 14/967,096

(22) Filed: Dec. 11, 2015

(30) Foreign Application Priority Data

Nov. 30, 2015 (TW) ............................. 104139897 A

(51) Int. Cl.
G08B 23/00 (2006.01)
G01D 4/00 (2006.01)
H04Q 9/00 (2006.01)

(52) U.S. Cl.
CPC .............. *G01D 4/002* (2013.01); *H04Q 9/00* (2013.01); *H04Q 2209/30* (2013.01); *H04Q 2209/60* (2013.01)

(58) Field of Classification Search
CPC ..................................................... G01D 4/002
USPC .................................................... 340/870.02
See application file for complete search history.

(56) References Cited

U.S. PATENT DOCUMENTS

| | | | | |
|---|---|---|---|---|
| 8,791,821 B2* | 7/2014 | Kiss | .......................... | H04Q 9/00 340/540 |
| 2010/0306533 A1* | 12/2010 | Phatak | ..................... | G06F 21/34 713/156 |
| 2012/0126790 A1* | 5/2012 | Sobotka | ................. | G01D 4/002 324/119 |
| 2014/0028463 A1* | 1/2014 | Chamarti | ............... | G01D 4/002 340/870.02 |
| 2014/0072059 A1* | 3/2014 | Krishnan | ............... | G01D 4/002 375/257 |

(Continued)

FOREIGN PATENT DOCUMENTS

| | | |
|---|---|---|
| CN | 101667335 A | 3/2010 |
| PH | 12015000191 | 6/2015 |

OTHER PUBLICATIONS

Taiwan Patent Office, Office action issued on Jul. 29, 2016.

*Primary Examiner* — Santiago Garcia
(74) *Attorney, Agent, or Firm* — Li & Cai Intellectual Property (USA) Office

(57) ABSTRACT

Disclosed is an advanced metering infrastructure (AMI) system, used in a power system that comprises a high-voltage power supplying switch, at least one transformer and at least one smart meter. Each transformer has one end connected to at least one smart meter and has another end connected to the high-voltage power supplying switch or at least another transformer. The AMI system comprises a plurality of power line bridges and at least one data concentrator unit (DCU). Each power line bridge is connected to the transformer in parallel. The DCU has one end electrically connected to the power line bridge. The power line bridge has one end electrically connected to the smart meter, and another end electrically connected to the DCU. The power line bridge communicates with the smart meter via the narrowband power line communication (NPLC), and communicates with the DCU via the broadband over power line communication (BPLC).

12 Claims, 6 Drawing Sheets

(56) References Cited

U.S. PATENT DOCUMENTS

2014/0167975 A1* 6/2014 Smith ................. H04W 52/242
340/870.02
2014/0361907 A1* 12/2014 Bernheim .............. H04B 3/546
340/870.02

* cited by examiner

ADVANCED METERING INFRASTRUCTURE SYSTEM

BACKGROUND OF THE INVENTION

1. Field of the Invention

The instant disclosure relates to an advanced metering infrastructure system; in particular, to an advanced metering infrastructure system can greatly improve the efficiency for real-time monitoring a power system.

2. Description of Related Art

FIG. 1 shows a schematic diagram of a traditional metering infrastructure system equipped in a power system in the prior art. As shown in FIG. 1, one specific power system is equipped with a metering system comprising the transformers T1~T6 by the power-providing end P. In this power system, one data concentrator unit DCU' is connected to each of the transformers T1~T6 to collect the power-consuming data recorded by the smart meters M1~M6, and to transmit the collected power-consuming data.

However, the problems need to be faced with are that, only one local network (LAN) communication can be chosen for the data transmission in this traditional metering system. For example, if the radio frequency communication or the narrowband power line communication is used for the data transmission, the data concentrator units connected to the transformers can only collected the power-consuming data recorded by the meter corresponding to the transformer or by other near meters, so that the power-consuming data transmission and the power-consuming data collection would be restricted. For another example, if the broadband over power line communication is chosen for the data transmission, the power-consuming data recorded by more meters can be collected, but the transmission of the data signals would be interfered with transmission of the power signals, which makes the transmission of the data signals unstable.

In addition, in this traditional metering system, the power-consuming data that the data concentrator unit can collect are limited, and these data are not provided for further use. Moreover, the cost for making a power system equipped with the data concentrator units would be considerable.

SUMMARY OF THE INVENTION

The instant disclosure provides an advanced metering infrastructure system, used in a power system, for monitoring the provided power and consumed power recorded by the smart meter. The power system comprises a high-voltage power supplying switch, at least one transformer and at least one smart meter, wherein each transformer has one end electrically connected to at least one smart meter and another end electrically connected to the high-voltage power supplying switch or at least another transformer. The advanced metering infrastructure system comprises a plurality of power line bridges and at least one data concentrator unit. Each power line bridge is electrically connected to the transformer of the power system in parallel. The data concentrator unit has one end electrically connected to the power line bridge. One end of the power line bridge is electrically connected to the smart meter, and another end of the power line bridge is electrically connected to the data concentrator unit. The power line bridge communicates with the smart meter via the narrowband power line communication, to receive power-consuming data recorded by the smart meter. The power line bridge communicates with the data concentrator unit via the broadband over power line communication, to transmit the received power-consuming data to the data concentrator unit.

In one embodiment of the instant disclosure, the power line bridge comprises a broadband over power line communication module and a narrowband power line communication module. The broadband over power line communication module is connected to the narrowband power line communication module. The broadband over power line communication module and the narrowband power line communication module respectively comprise a transceiver and a microprocessor connected with each other.

In one embodiment of the instant disclosure, the power line bridge comprises a first transceiver, a second transceiver and a microprocessor. The microprocessor is connected between the first transceiver and the second transceiver.

In one embodiment of the instant disclosure, the data concentrator unit is electrically connected to the high-voltage power supplying switch in parallel, and in another embodiment of the instant disclosure, the data concentrator unit is electrically connected to one of the transformers in parallel.

In one embodiment of the instant disclosure, the data concentrator unit comprises a transmission module, an operation module, a storage module and an alert module. The operation module is connected to the transmission module. The operation module receives the power-consuming data transmitted from the power line bridge via the transmission module, and operates the power-consuming data. The storage module is connected to the transmission module and the operation module. The storage module stores a plurality of historical power-consuming data and the operated power-consuming data, and transmits the stored power-consuming data to a power consumer or a power provider. The power-consuming data comprises a power consumption, a power distribution in rush-hour and an area total voltage. The alert module is connected to the transmission module and the operation module, to transmit an alerting message to the power consumer or the power provider.

To sum up, in the advanced metering infrastructure system provided by the instant disclosure, the power line bridge is connected to the transformer in parallel, so one end of the power line bridge can communicate with the smart meter via the narrowband power line communication and another end of the power line bridge can communicate with the data concentrator unit via the broadband over power line communication. It effectively extends the signal transmission distance of the power-consuming data, and also increases the quantity of power-consuming data which every signal data concentrator unit can collect. Moreover, in the advanced metering infrastructure system provided by the instant disclosure, the data concentrator unit is also configured to operate and analyze the power-consuming data of the power consumers, which makes the power provider and the power consumer know their power-consuming data. In addition, the data concentrator unit is configured to immediately alert the power provider or the power consumer once the power-consuming data show certain abnormal situation, to maintain the safety of power-providing and power-consuming.

For further understanding of the instant disclosure, reference is made to the following detailed description illustrating the embodiments and embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

[One Embodiment of the Advanced Metering Infrastructure System]

Figure 2:
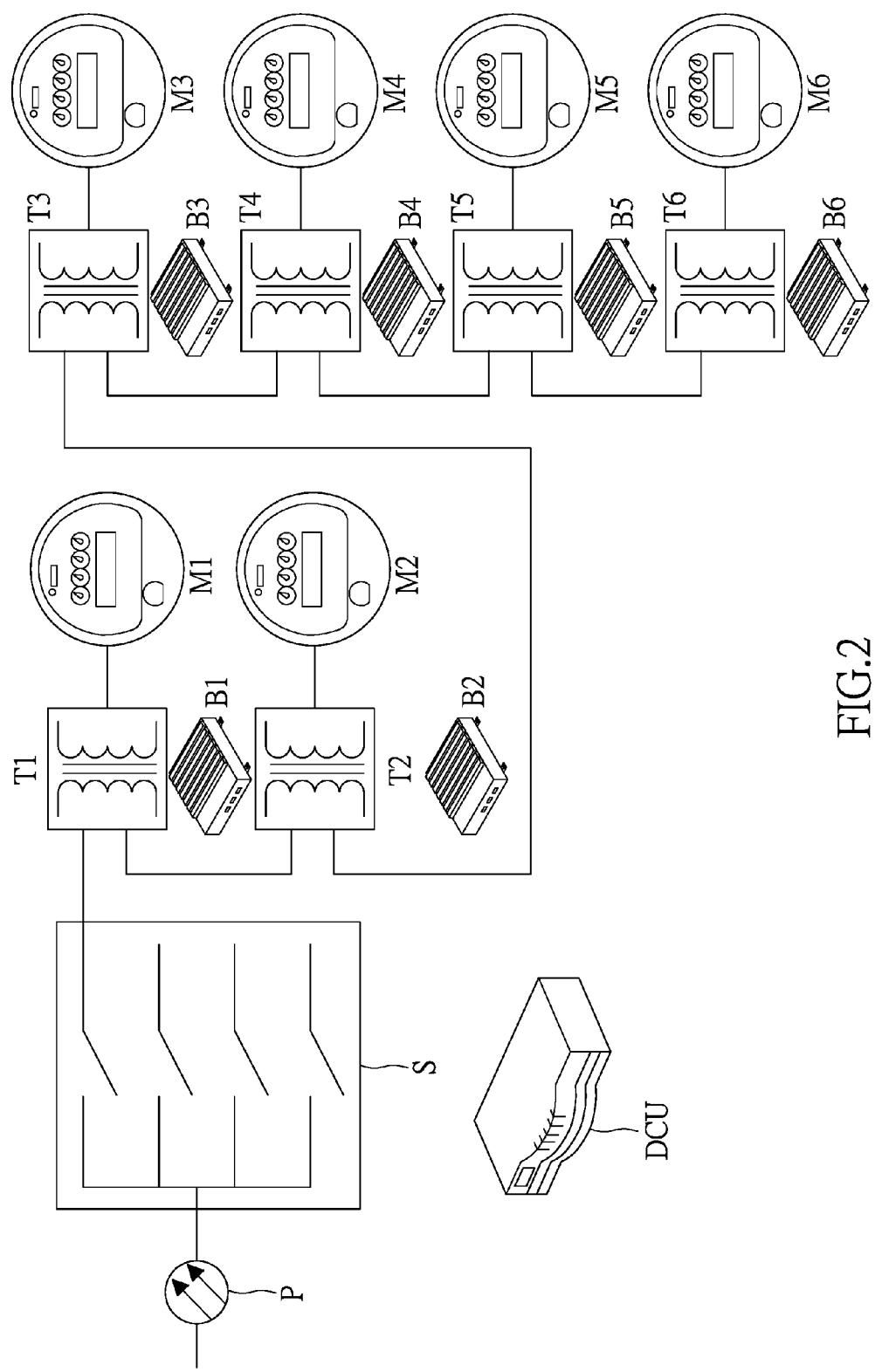
FIG. 2 shows a schematic diagram of an advanced metering infrastructure system equipped in a power system in one embodiment of the instant disclosure.

The advanced metering infrastructure system provided by this embodiment is used in a power system, for real-time monitoring a power system. FIG. 2 shows a schematic diagram of an advanced metering infrastructure system equipped in a power system in one embodiment of the instant disclosure. The power system shown in FIG. 2 comprises at least one high-voltage power supplying switch S, at least one transformer T1~T6, and at least one smart meter M1~M6. The high-voltage power supplying switch S distributes the power provided by the power-providing end P. Each transformer T1~T6 has one end connected to at least one smart meter M1~M6, and has another end connected to the high-voltage power supplying switch S or at least another transformer T1~T6.

The above power system is equipped with the advanced metering infrastructure system provided by this embodiment. As shown in FIG. 2, the advanced metering infrastructure system provided by this embodiment comprises a plurality of power line bridges B1~B6 and at least one data concentrator unit DCU. In should be noticed that, in this embodiment, power line bridges B1~B6 are respectively connected to the transformers T1~T6 in parallel, wherein each of power line bridges B1~B6 has one end electrically connected to the smart meter. The data concentrator unit DCU is connected to the high-voltage power supplying switch S in parallel, wherein the data concentrator unit DCU has one end electrically connected to the power line bridges power line bridge.

Figure 1:
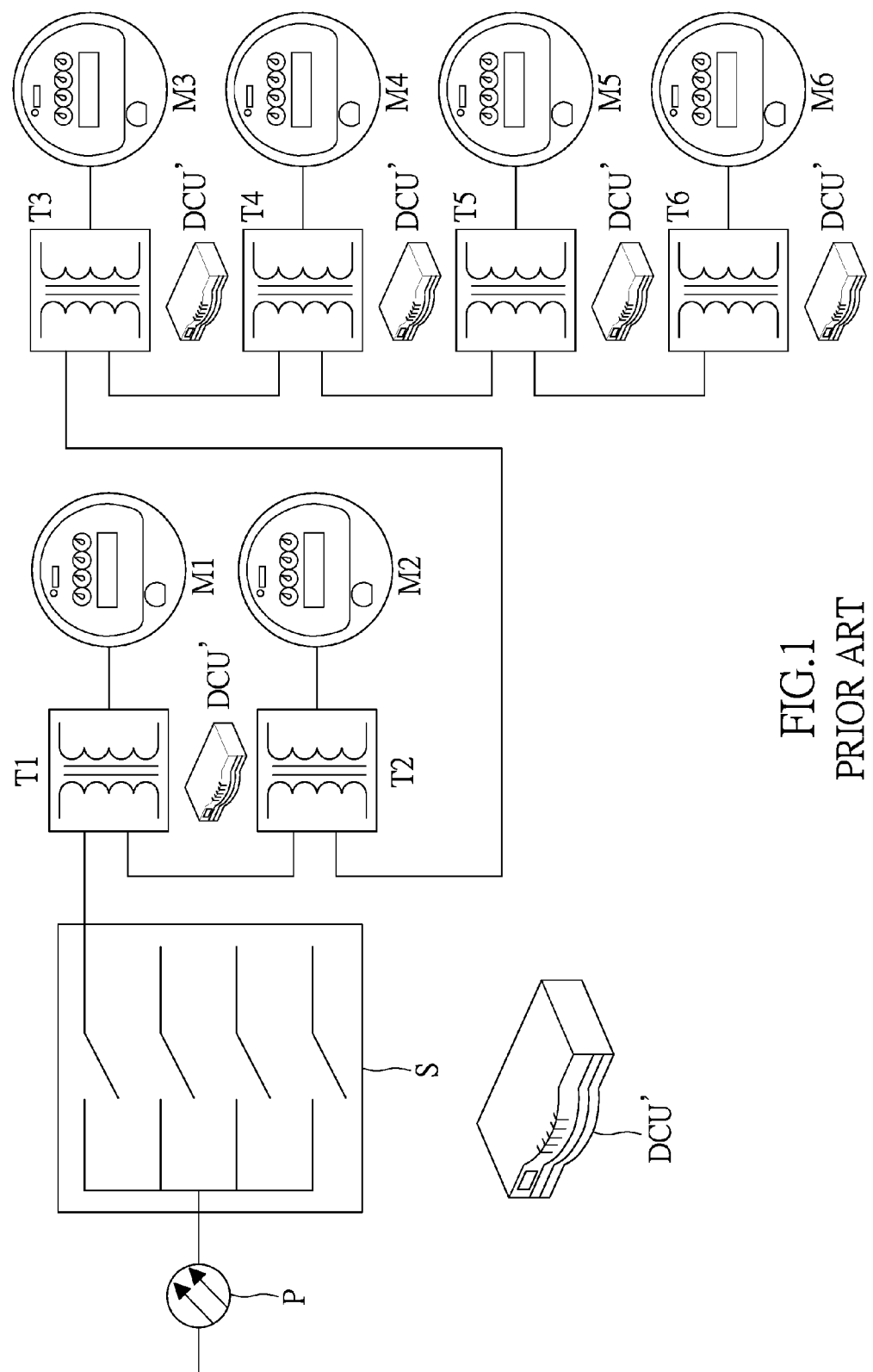
FIG. 1 shows a schematic diagram of a traditional metering infrastructure system equipped in a power system in the prior art.

Different from the prior art shown in FIG. 1, in the advanced metering infrastructure system provided by this embodiment, there are power line bridges B1~B6 helping the data concentrator unit DCU to transmit and collect the power-consuming data of each of smart meters M1~M6. In other words, in this embodiment, in one power-consuming area, the power-consuming data of each of smart meters M1~M6 are transmitted, via the power line bridge B1~B6 that are connected to the corresponding transformers T1~T6 in parallel, to the data concentrator unit DCU. After that, the data concentrator unit DCU collects the received power-consuming data of all smart meters in this power-consuming area. In this way, there is only one data concentrator unit DCU needed in one power-consuming area for collecting the power-consuming data of all smart meters in this power-consuming area, which actually reduce the cost of the AMI system.

Specifically speaking, in this embodiment, the power line bridges B1~B6 communicate with the smart meters M1~M6 via the narrowband power line communication to receive the power-consuming data of the smart meters, and the power line bridges B1~B6 communicate with the data concentrator unit DCU via the broadband over power line communication to transmit the received power-consuming data to the data concentrator unit DCU. Thereby, two kinds of signal transmissions can be both used for transmitting the power-consuming data, and the signal transmission distance of the power-consuming data can be effectively extended, which overcome the limitation that the traditional metering system can merely use one local network (LAN) communication to transmit the data signals.

Figure 3A:
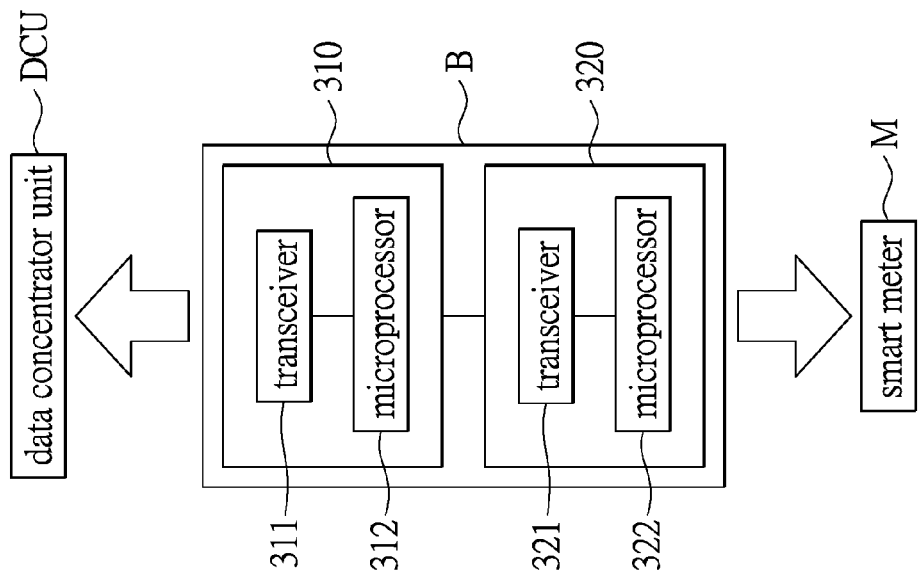
FIG. 3A shows a block diagram of a power line bridge of the advanced metering infrastructure system in one embodiment of the instant disclosure.

For example, please refer to FIG. 3A, FIG. 3A shows a block diagram of a power line bridge of the advanced metering infrastructure system in one embodiment of the instant disclosure. As shown in FIG. 3A, the power line bridge B in the advanced metering infrastructure system provided by the instant disclosure comprises a broadband over power line communication module 310 and a narrowband power line communication module 320, and the broadband over power line communication module 310 is connected to the narrowband power line communication module 320. Moreover, the broadband over power line communication module 310 and the narrowband power line communication module 320 respectively comprise a transceiver 311 and a microprocessor 312, and a transceiver 321 and a microprocessor 322, wherein the transceiver 311 is connected to the microprocessor 312 and the transceiver 321 is connected to the microprocessor 322.

In details, in one embodiment, the data transmission between the broadband over power line communication module 310 and the narrowband power line communication module 320 of the power line bridge B is via a UART interface. Additionally, data transmissions between the transceiver 311 and the microprocessor 312, and the transceiver 321 and the microprocessor 322 are also via UART interfaces; however, it is not limited herein.

Figure 3B:
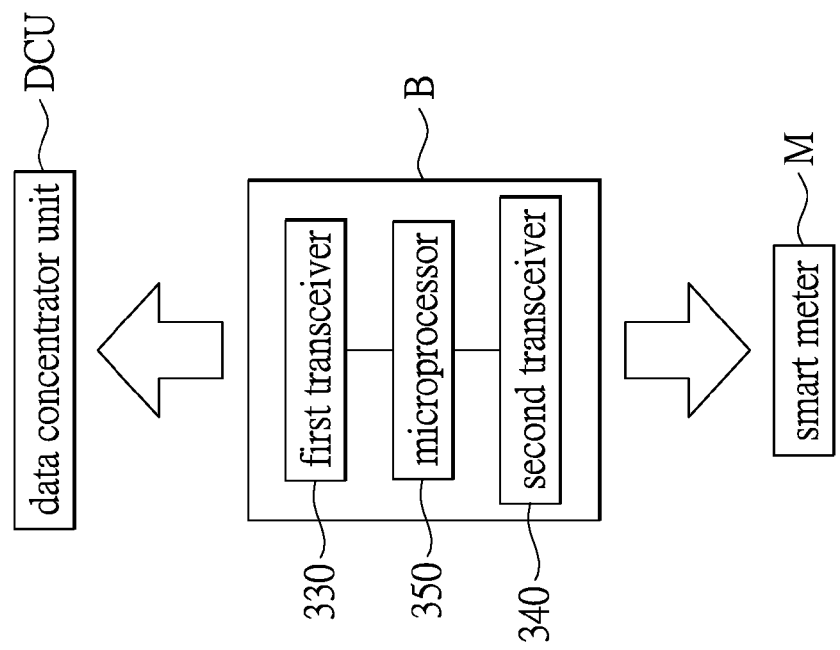
FIG. 3B shows a block diagram of a power line bridge of the advanced metering infrastructure system in another embodiment of the instant disclosure.

For another example, please refer to FIG. 3B, FIG. 3B shows a block diagram of a power line bridge of the advanced metering infrastructure system in another embodiment of the instant disclosure. As shown in FIG. 3B, the power line bridge B in the advanced metering infrastructure system provided by the instant disclosure comprises a first transceiver 330, a second transceiver 340 and a microprocessor 350, wherein the microprocessor 350 is connected between the first transceiver 330 and the second transceiver 340. Specifically, the first transceiver 330 communicates with the data concentrator unit DCU via the broadband over power line communication, and the second transceiver 340 communicates with the smart meter M via the narrowband power line communication.

Likewise, in one embodiment, the data transmission between the first transceiver 330 of the power line bridge B and the microprocessor 350 of the power line bridge B is via a UART interface. Moreover, the data transmission between the second transceiver 340 of the power line bridge B and the microprocessor 350 of the power line bridge B is also via a UART interface. However, it is not limited herein.

Figure 4:
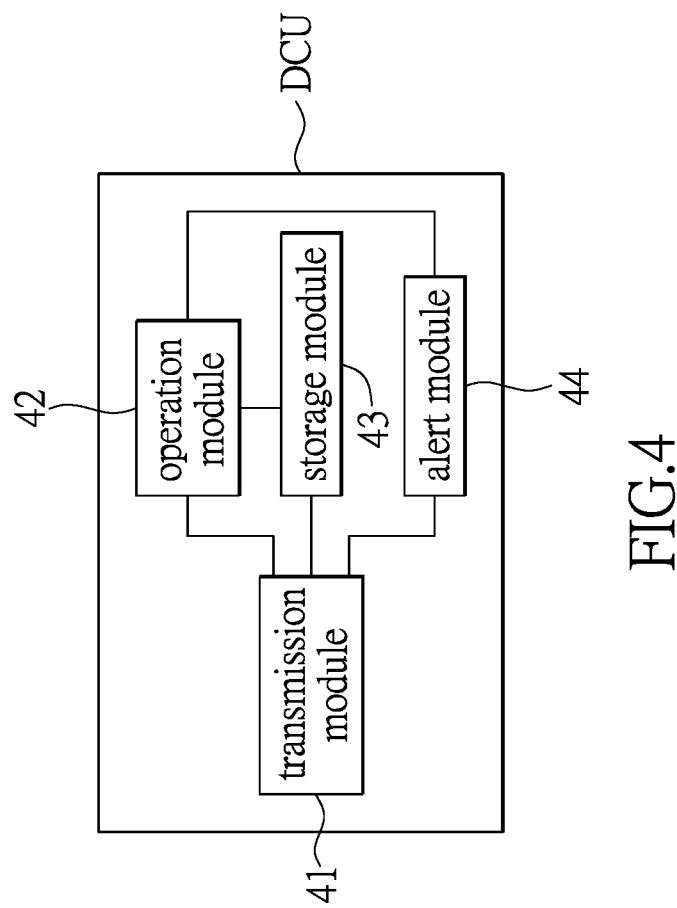
FIG. 4 shows a block diagram of a data concentrator unit of the advanced metering infrastructure system in one embodiment of the instant disclosure.

It should be noticed that, in the advanced metering infrastructure system provided by the instant disclosure, both of the power line bridges B provided by the embodiments shown in FIG. 3A and FIG. 3B communicate with the smart meter M via the narrowband power line communication, to ensure the effective data transmission distance and data transmission quality. In addition, both of the power line bridges B provided by the embodiments shown in FIG. 3A and FIG. 3B communicate with the data concentrator unit DCU via the broadband over power line communication, to provide the sufficient data transmission capacity and the data transmission speed. In other words, both of the power line bridges B provided by the embodiments shown in FIG. 3A and FIG. 3B make the advanced metering infrastructure system provided by the instant disclosure overcome the limitation that the traditional metering system can merely use one local network (LAN) communication to transmit the data signals Please refer to FIG. 4, FIG. 4 shows a block diagram of a data concentrator unit of the advanced metering infrastructure system in one embodiment of the instant disclosure. In one embodiment, the data concentrator unit DCU in the advanced metering infrastructure system provided by the instant disclosure comprises a transmission module 41, an operation module 42, a storage module 43 and an alert module 44.

As shown in FIG. 4, the operation module 42 is connected to the transmission module 41, and the operation module 42 is configured to receive the power-consuming data transmitted from the power line bridge (not shown in FIG. 4) via the transmission module 41, and to operate the received power-consuming data. The storage module 43 is connected to the transmission module 41 and the operation module 42, and the storage module 43 is configured to store a plurality of historical power-consuming data and the operated power-consuming data, and to transmit the stored power-consuming data to a power consumer or a power provider via the transmission module 41. The power-consuming data comprises the power consumption, the power distribution in rush-hour and the area total voltage; however, it is not limited herein.

It should be noticed that, the power consumption in the power-consuming data refers to the power consumption recorded by every single smart meter per day. The power distribution in rush-hour in the power-consuming data refers to the total distributed power of all power consumers corresponding to one transformer in the rush hours per day. The area total voltage in the power-consuming data refers to the total voltage of the power-consuming area corresponding to one data concentrator unit. Thus, via the instant disclosure, both of the power provider and the power consumer can communicate with the data concentrator unit DCU and obtain the power-consuming data from the storage module 43 of the data concentrator unit DCU, to know the power providing situation or the power consuming situation currently or in the past.

Additionally, in this embodiment, based on the power-consuming data operated by the operation module 42, the alert module 44 connecting to the transmission module 41 and the operation module 42 of the data concentrator unit DCU would determine whether to transmit an alerting message to the power consumer or the power provider.

In one embodiment, the operation module 42 of the data concentrator unit DCU, each day, compares the power consumption in the operated power-consuming data and the power consumption in the historical power-consuming data and generates a difference. The alert module 44 would transmit an alerting message to the power consumer or the power provider once the difference is larger than a predetermined threshold. For example, once the difference between the power consumption recorded in one signal day and the historical power consumption recorded in the last day is larger than a predetermined threshold, the alert module 44 would transmit an alerting message to the power consumer or the power provider. In this example, the alert message is mainly provided to the power consumer, such that the power consumer can know there is an abnormal power-consuming situation and can further adjust his certain habit of using electricity.

In another embodiment, the operation module 42 of the data concentrator unit DCU compares the power distribution in rush-hour in the operated power-consuming data and a maximum transformer capacity of the corresponding transformer (not shown I FIG. 4). The alert module 44 would transmit an alerting message to the power consumer or the power provider once the power distribution in rush-hour has been larger than the maximum transformer capacity for a first predetermined time. For example, the alert module 44 would transmit an alerting message to the power consumer or the power provider once the power distribution in rush-hour has been larger than the maximum transformer capacity of the corresponding transformer for a first predetermined time for three days. In this example, the alert message is mainly provided to the power provider, such that the power provider can be informed of the malfunction of the transformer in time, to immediately examine and fix the transformer that seems to breakdown.

In still another embodiment, every day, between every time interval, the operation module 42 compares the area total voltage respectively with an upper-limit threshold and a lower-limit threshold. The alert module 44 transmits an alerting message to the power consumer or the power provider once the area total voltage has been larger than the upper-limit threshold or less than the lower-limit threshold for a second predetermined time. For example, every day, between every 15 minutes, the area total voltages obtained by the data concentrator unit DCU have been larger than the upper-limit threshold or less than the lower-limit threshold for 45 minutes, the alert module 44 transmits an alerting message to the power consumer or the power provider. In this example, the alert message is mainly provided to the power provider, such that the power provider can immediately deal with the abnormal power-providing situation occurred in a certain area to maintain the safety of power-providing.

The above embodiments are majorly for illustrating the advanced metering infrastructure system provided by the instant disclosure, but not for restricting the advanced metering infrastructure system provided by the instant disclosure. It should be noticed that, in addition to the power consumption, the power distribution in rush-hour and the area total voltage, the above mentioned power-consuming data can further comprise other operated quantity values, to provide more corresponding applications and service to the power provider or the power consumer, and the types of the operated quantity values here are not limited.

In order to further illustrate the advanced metering infrastructure system provided by the instant disclosure, there is one more embodiment in the following description. In the embodiment to be described, there are only parts different from the embodiment shown in FIG. 2, and the omitted parts are indicated to be identical to the embodiment shown in FIG. 2. In addition, for an easy instruction, similar reference numbers or symbols refer to elements alike.

[Another Embodiment of the Advanced Metering Infrastructure System]

Figure 5:
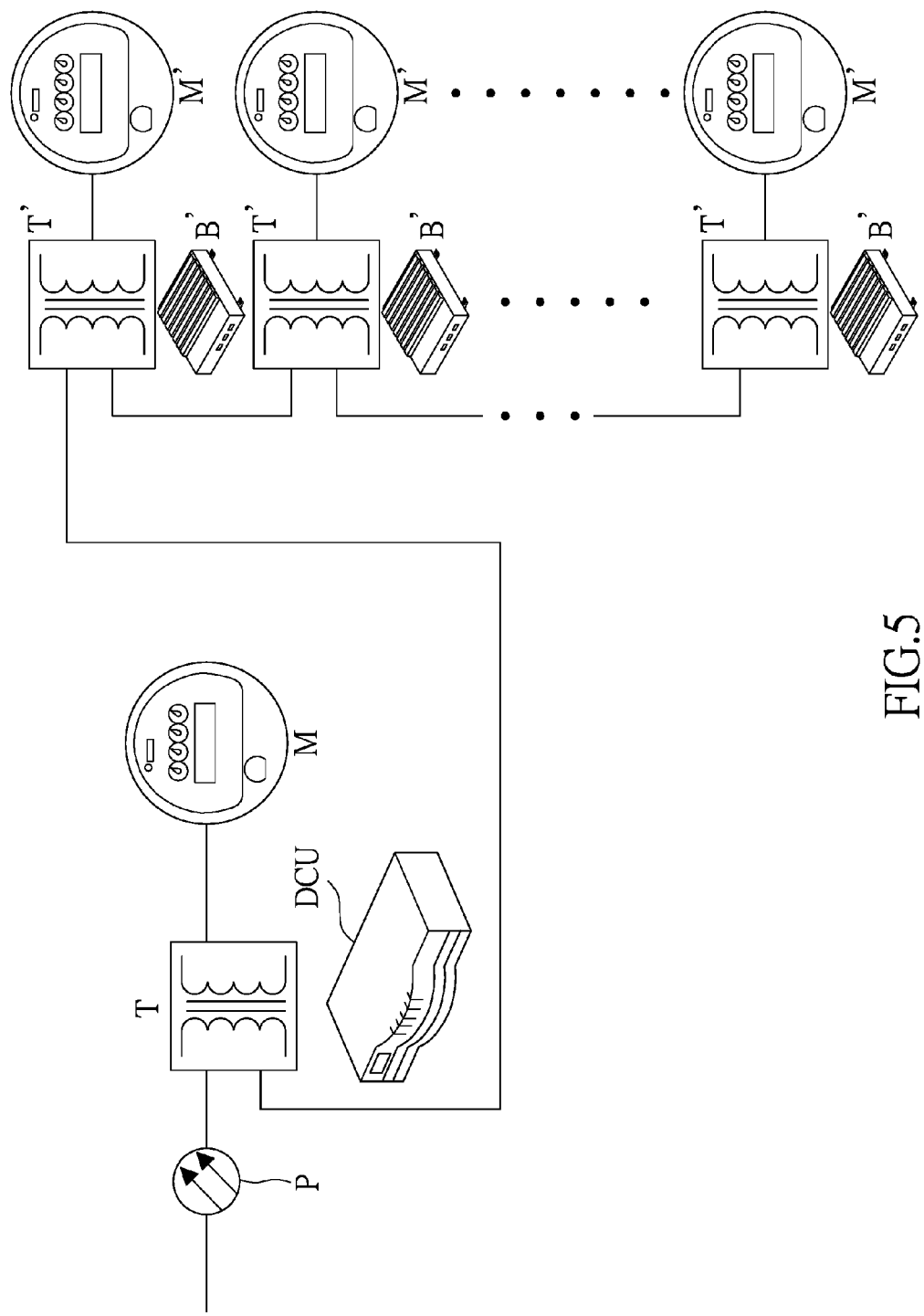
FIG. 5 shows a schematic diagram of an advanced metering infrastructure system equipped in a power system in another embodiment of the instant disclosure.

The advanced metering infrastructure system provided in this embodiment is used in a power system, for monitoring the provided power and consumed power recorded by the smart meter. Please refer to FIG. 5, FIG. 5 shows a schematic diagram of an advanced metering infrastructure system equipped in a power system in another embodiment of the instant disclosure. The power system shown in FIG. 5 comprises at least one transformer T and T' and at least one smart meter M and M'. In terms of the power transmission of a power system in this field of art, with respect to the transformer T, the transformer T' is configured be at a lower power transmission level. In other words, the power provided by the power-providing end P would be first transmitted to the transformer T, and then be distributed to each transformer T' by the transformer T. Each transformer T and T' has one end connected to at least one smart meter M and M', and has another end connected to at least another transformer T and T'.

The above power system is equipped with the advanced metering infrastructure system provided by the instant disclosure. As shown in FIG. 5, the advanced metering infrastructure system provided by this embodiment comprises a plurality of power line bridges and at least one data concentrator unit DCU.

The elements and working mechanisms of the advanced metering infrastructure systems provided by this embodiment and the embodiment shown in FIG. 2 are similar, and the similar elements and working mechanism have been described I the above embodiments in details, and thus the redundant information is not repeated. However, the difference between the advanced metering infrastructure systems provided by this embodiment and the embodiment shown in FIG. 2 is that, in the advanced metering infrastructure systems provided by this embodiment (shown in FIG. 5), the data concentrator unit DCU is connected to the transformer T in parallel, and the power line bridges B' are respectively connected to the transformers T' which are configured at the lower power transmission levels. Specifically, each power line bridge B' is connected to the transformer T' in the power system I parallel, wherein the power line bridge B' has one end connected to the smart meter M'. The data concentrator unit DCU is connected to one of the transformers T in parallel, wherein the data concentrator unit DCU has one end electrically connected to the power line bridge B'. Moreover, like the working mechanism of the advanced metering infrastructure system provided by the embodiment shown in FIG. 2, in this embodiment, the power line bridge B' communicates with the smart meter M' via the narrowband power line communication to receive the power-consuming data recorded by the smart meter M', and the power line bridge B' communicates with the data concentrator unit DCU via the broadband over power line communication to transmit the received power-consuming data to the data concentrator unit DCU.

Regarding to the advanced metering infrastructure systems provided by the embodiments shown in FIG. 2 and FIG. 5, it should be noticed that, currently the advanced metering infrastructure system provided by the embodiments shown in FIG. 2 is more suitable for the power systems in most of power-consuming areas in Taiwan, wherein the data concentrator unit is configured to be between the power provider and the transformer, and more precisely, is connected to the power-distributing apparatus arranged at the former power-transmission level of the transformer, which should be a high-voltage power supplying switch, such as a four way switch. On the other hand, in terms of the power system in certain area such as an industrial area, it is common that the transformer configured at the next power-transmission level of the high-voltage power supplying switch distributes power to many smart meters, such as 300~500 smart meters. In this case, it would be more proper to make the data concentrator unit connected to the transformer arranged at the next power-transmission level of the high-voltage power supplying switch, as shown in FIG. 5.

In other words, the advanced metering infrastructure system provided by the embodiment shown in FIG. 2 is properly used in the power-consuming areas where the amount of smart meters configured at the lower power-transmission levels of the high-voltage power supplying switch is not a huge number, such as 300~500, which refers to most of power-consuming areas in Taiwan. The advanced metering infrastructure system provided by the embodiment shown in FIG. 5 is properly used in power-consuming areas where the amount of smart meters configured at the lower power-transmission levels of the high-voltage power supplying switch is a huge number, such as 300~500, which refers to certain industrial area. However, no matter the power line bridge is configured to be connected to the high-voltage power supplying switch or the transformer in parallel, in the advanced metering infrastructure systems provided by the above embodiments, the power line bridge helps to effectively extend the signal transmission distance of the power-consuming data, and also increases the quantity of power-consuming data which every signal data concentrator unit can collect.

To sum up, in the advanced metering infrastructure system provided by the instant disclosure, the power line bridge is connected to the transformer in parallel, so one end of the power line bridge can communicate with the smart meter via the narrowband power line communication and another end of the power line bridge can communicate with the data concentrator unit via the broadband over power line communication. It effectively extends the signal transmission distance of the power-consuming data, and also increases the quantity of power-consuming data which every signal data concentrator unit can collect. Moreover, in the advanced metering infrastructure system provided by the instant disclosure, the data concentrator unit is also configured to operate and analyze the power-consuming data of the power consumers, which makes the power provider and the power consumer know their power-consuming data. In addition, the data concentrator unit is configured to immediately alert the power provider or the power consumer once the power-consuming data show certain abnormal situation, to maintain the safety of power-providing and power-consuming.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. An advanced metering infrastructure system, used in a power system for monitoring the provided power and consumed power recorded by a smart meter, the power system comprising a high-voltage power supplying switch, at least one transformer and at least one smart meter, wherein each transformer has one end electrically connected to at least one smart meter and another end electrically connected to the high-voltage power supplying switch or at least another transformer, the advanced metering infrastructure system comprising:
   a plurality of power line bridges, each power line bridge electrically connected to the transformer of the power system in parallel, and comprising a broadband over power line communication module and a narrowband power line communication module, wherein the broadband over power line communication module is directly connected to the narrowband power line communication module; and
   at least one data concentrator unit, having one end electrically connected to the power line bridge;
   wherein one end of the power line bridge is electrically connected to the smart meter, another end of the power line bridge is electrically connected to the data concentrator unit, the power line bridge communicates with the smart meter via the narrowband power line communication module to receive power-consuming data recorded by the smart meter, and the power line bridge communicates with the data concentrator unit via the broadband over power line communication module to transmit the received power-consuming data to the data concentrator unit.

2. The advanced metering infrastructure system according to claim 1, wherein the broadband over power line communication module and the narrowband power line communication module respectively comprise a transceiver and a microprocessor connected with each other.

3. The advanced metering infrastructure system according to claim 2, wherein a data transmission between the broadband over power line communication module and the narrowband power line communication module, and data transmissions between the transceiver and the microprocessor in the broadband over power line communication module and the narrowband power line communication module are via a Universal Asynchronous Receiver/Transmitter (UART) interface respectively.

4. The advanced metering infrastructure system according to claim 1, wherein the power line bridge comprises a first transceiver, a second transceiver and a microprocessor, and the microprocessor is connected between the first transceiver and the second transceiver.

5. The advanced metering infrastructure system according to claim 4, wherein data transmissions between the first transceiver and the microprocessor and between the second transceiver and the microprocessor are via a UART interface respectively.

6. The advanced metering infrastructure system according to claim 1, wherein the data concentrator unit comprises:
   a transmission module;
   an operation module, connected to the transmission module, receiving the power-consuming data transmitted from the power line bridge via the transmission module, and operating the power-consuming data; and
   a storage module, connected to the transmission module and the operation module, storing a plurality of historical power-consuming data and the operated power-consuming data, and transmitting the stored power-consuming data to a power consumer or a power provider;
   wherein the power-consuming data comprises a power consumption, a power distribution in rush-hour and an area total voltage.

7. The advanced metering infrastructure system according to claim 6 wherein the data concentrator unit is electrically connected to the high-voltage power supplying switch in parallel.

8. The advanced metering infrastructure system according to claim 6 wherein the data concentrator unit is electrically connected to one of the transformers in parallel.

9. The advanced metering infrastructure system according to claim 6, wherein the data concentrator unit further comprises an alert module, the alert module is connected to the transmission module and the operation module to transmit an alerting message to the power consumer or the power provider.

10. The advanced metering infrastructure system according to claim 9, wherein the operation module compares the power consumption in the operated power-consuming data and the power consumption in the historical power-consuming data and generates a difference, and transmits the alerting message to the power consumer or the power provider if the difference is larger than a predetermined threshold.

11. The advanced metering infrastructure system according to claim 9, wherein the operation module compares the power distribution in rush-hour in the operated power-consuming data and a maximum transformer capacity of the transformer, and transmits the alerting message to the power consumer or the power provider if the power distribution in rush-hour has been larger than the maximum transformer capacity for a first predetermined time.

12. The advanced metering infrastructure system according to claim 9, wherein the operation module compares the area total voltage respectively with an upper-limit threshold and a lower-limit threshold, and transmits the alerting message to the power consumer or the power provider if the area total voltage has been larger than the upper-limit threshold or less than the lower-limit threshold for a second predetermined time.

* * * * *